United States Patent
Marolia et al.

(10) Patent No.: US 8,005,468 B2
(45) Date of Patent: Aug. 23, 2011

(54) PERSONALIZATION, DIAGNOSTICS AND TERMINAL MANAGEMENT FOR MOBILE DEVICES IN A NETWORK

(75) Inventors: Sunil Marolia, Laguna Niguel, CA (US); Preston Carlton Peyton, Jr., Waynesville, NC (US); Bindu Rama Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1085 days.

(21) Appl. No.: 11/824,344

(22) Filed: Jun. 29, 2007

(65) Prior Publication Data

US 2008/0057947 A1    Mar. 6, 2008

Related U.S. Application Data

(60) Provisional application No. 60/818,112, filed on Jun. 29, 2006.

(51) Int. Cl.
*H04M 3/00* (2006.01)

(52) U.S. Cl. .................. 455/418; 455/419; 455/414.1
(58) Field of Classification Search .............. 455/418, 455/419, 414.1
See application file for complete search history.

(56) References Cited

U.S. PATENT DOCUMENTS

| | | |
|---|---|---|
| 6,347,331 B1 | 2/2002 | Dutcher et al. |
| 2004/0098421 A1 | 5/2004 | Peng |
| 2005/0264404 A1 | 12/2005 | Franczyk |
| 2006/0052089 A1 | 3/2006 | Khurana et al. |

OTHER PUBLICATIONS

"International Search Report and Written Opinion" for PCT Application PCT/US2007/072493, dated Dec. 21, 2007.

*Primary Examiner* — Temica M Beamer

(57) ABSTRACT

A system, method, and device supporting delivery of personalized information via an electronic device of a user. Personalizations of an electronic device for a prior user are removed at activation of the device in a network. Personalizations for a user are also installed upon activation of the electronic device, according to user associated preference information stored in at least one server. The at least one server distributes update information for personalizing the electronic device, using the stored preference information. The stored preference information is also used to activate at least one network-based service.

21 Claims, 9 Drawing Sheets

PERSONALIZATION, DIAGNOSTICS AND TERMINAL MANAGEMENT FOR MOBILE DEVICES IN A NETWORK

The present application makes reference to, claims priority to, and claims benefit of U.S. Provisional Application Ser. No. 60/818,112 entitled "PERSONALIZATION, DIAGNOSTICS AND TERMINAL MANAGEMENT FOR MOBILE DEVICES IN A NETWORK", filed Jun. 29, 2006, the complete subject matter of which is hereby incorporated herein by reference, in its entirety.

In addition, the present application makes reference to U.S. Provisional Patent Application Ser. No. 60/785,879. entitled "DEVICE AND NETWORK CAPABLE OF MOBILE DIAGNOSTICS BASED ON DIAGNOSTICS MANAGEMENT OBJECTS", filed Mar. 24, 2006, U.S. Provisional Patent Application Ser. No. 60/774,989 entitled "DEVICE CAPABILITY DETERMINATION FOR A MOBILE DEVICE", filed Feb. 16, 2006, U.S. Provisional Patent Application Ser. No. 60/249,606, entitled "System and Method for Updating and Distributing Information," filed Nov. 17, 2000, and International Patent Application Publication No. WO 02/41147 A1, entitled "System And Method For Updating And Distributing Information", filed Nov. 19, 2001, and having publication date Mar. 23, 2002, the complete subject matter of each of which is hereby incorporated herein by reference, in its entirety.

BACKGROUND OF THE INVENTION

Non-volatile memory is employed in a wide variety of electronic devices such as, for example, mobile handsets, cellular phones, personal digital assistants (PDA's), pagers and handheld personal computers. The non-volatile memory in these devices contain firmware, application software, data, and configuration information that makes the devices operational, and may be provided by the manufacturers of the electronic devices, by system operators of telecommunication carrier networks, or by third parties developers. If defects are found in such firmware/software, or if new features are to be added to such devices, the software and/or firmware in the affected electronic devices may need to be updated. Errors and/or interruptions that may occur during the updating of such operational code may leave the electronic device in a partly or completely non-functional state. To avoid this problem, present methods of updating such software and/or firmware involve returning the electronic device to the manufacturer, to the system operator, or to the third party, so that an update of memory contents may be performed using a direct connection to the electronic device. This is both costly and inconvenient to both the user of the electronic device, and to one performing the update.

Configuration parameters and other information for an electronic device may be stored in the non-volatile memory of such devices, and information about the device capabilities, the hardware, software and manufacturer of the device, and particulars for a given instance of the device in a network may be stored in databases used by, for example, device management and customer service operations. Such databases may be accessible to device management and customer service operations through database access mechanisms using, for example, structured query language (SQL) or similar database management tools.

Updates to firmware and/or software in an electronic device may be developed by a number of parties including, for example, the manufacturer of the electronic device, the provider of services of a communication network accessed by the electronic device, or a third party. Users may subscribe to multiple network-based information services, and may receive numerous messages at the electronic device concerning information available, scheduled events, news, and the like. The volume of such information may impair the user's ability to maximize enjoyment and usefulness such services.

Electronic devices such as, for example, cellular phones and wireless enabled personal digital assistants are highly capable. A particular user of such a device, however, is limited by the common functionality offered to all users of a particular make, model and/or version of device.

Further limitations and disadvantages of conventional and traditional approaches will become apparent to one of skill in the art, through comparison of such systems with the present invention as set forth in the remainder of the present application with reference to the drawings.

DETAILED DESCRIPTION OF THE INVENTION

Aspects of the present invention relate generally to the updating of memory in electronic devices, and more specifically, to methods and systems supporting remote diagnosis and device management of electronic devices by one or more management authorities. While the following discussion focuses primarily on mobile electronic devices such as, for example, a mobile handset, a cellular phone, a personal digital assistant, a pager, and a handheld personal computer, this is by way of example and not by way of specific limitations of the present invention. The teaching contained herein may also be applicable to a variety of other electronic devices having a processor and memory containing software, firmware, configuration information, data files, and the like, for which updating of memory contents may be desirable.

Representative embodiments of the present invention may be employed during updates using wired or wireless communication links such as, for example, a public switched telephone network, a wired local or wide area network, an intranet, the Internet, and wireless cellular, paging, local area, personal area, and short range networks such as those referred to as WiFi, IEEE 802.11 a/b/g/n compatible networks, the short range wireless technology known as Bluetooth, and similar types of communication links.

In a representative embodiment of the present invention, information for updating memory in an electronic device such as those described above may be communicated using, for example, an update package comprising a set of instructions executable by firmware and/or software in the electronic device to transform or convert an existing version of software, firmware, and/or data in the electronic device into a new or updated version of the software, firmware, and/or data. Such an update package may also contain metadata related to the update.

Figure 1:
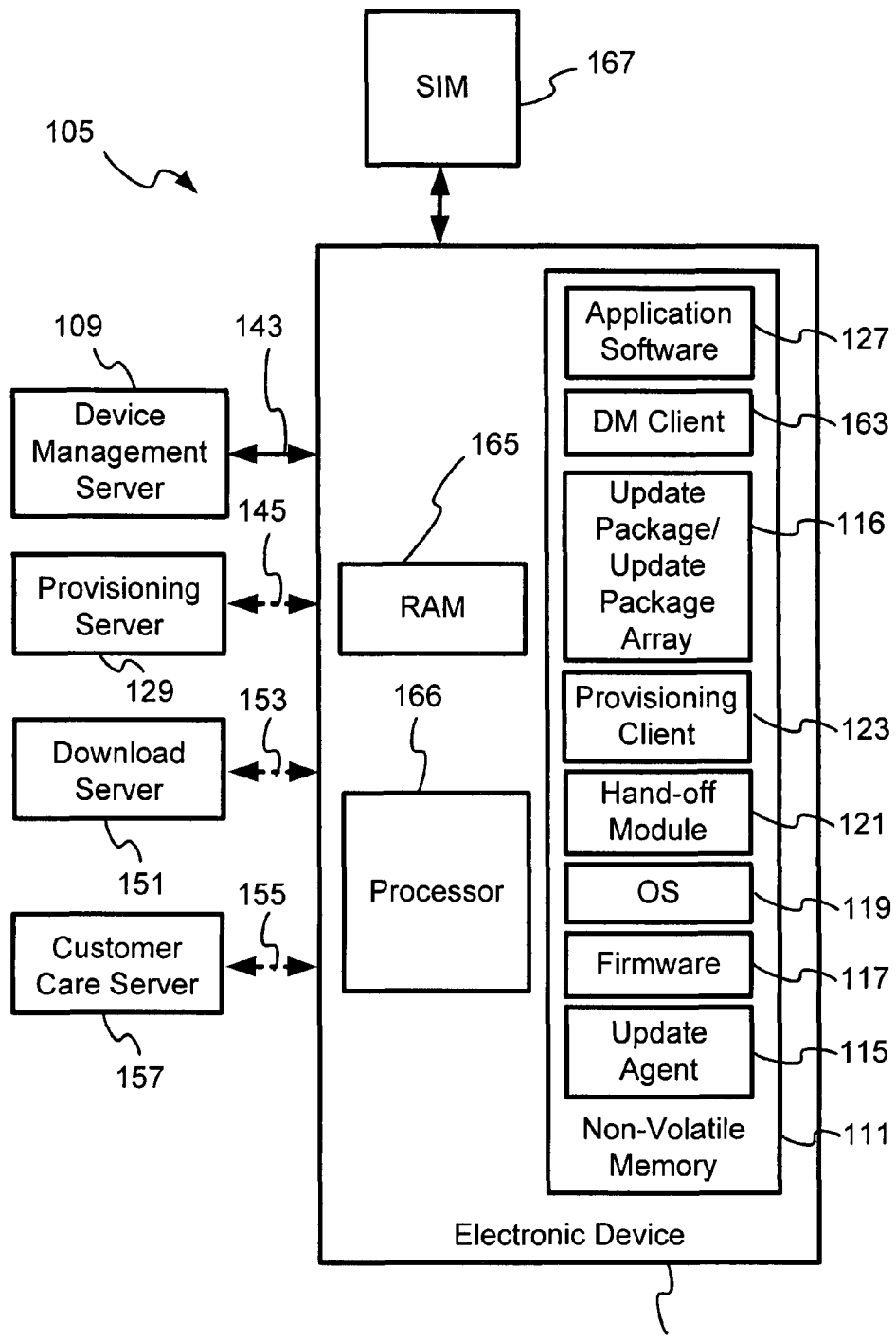
FIG. 1 is a perspective block diagram of an exemplary network that supports remote update of non-volatile memory of an electronic device such as, for example, a mobile handset or personal digital assistant, in accordance with a representative embodiment of the present invention.

FIG. 1 is a perspective block diagram of an exemplary network 105 that supports remote update of non-volatile memory of an electronic device 107 such as, for example, a mobile handset or personal digital assistant, in accordance with a representative embodiment of the present invention. The electronic device 107 may, for example, comprise a cellular phone, a personal digital assistant (PDA), a pager, a handheld personal computer (PC), and/or the like. The electronic device 107 may support a number of features and/or applications that may contain software/firmware errors that need to be corrected, or that may provide additional features/benefits by updating the software/firmware. The electronic device 107 may itself be used to request updates to software/firmware via a customer care server 157 either directly, using a browser in the electronic device 107, or via a customer service representative (CSR). A CSR may, for example, provide service to the customer using the electronic device 107 by retrieving, as necessary, one or more diagnostic management objects (MOs) stored in memory of the electronic device 107, and by transmitting to the electronic device 107 from a remote server, update information in the form of, for example, one or more update packages. Such update packages may, for example, comprise instructions to code in the electronic device 107 to convert or transform a first version of software/firmware to a second version of software/firmware, in the electronic device 107, in addition to metadata, and checksum information.

As shown in the illustration of FIG. 1, the network 105 in a representative embodiment of the present invention may comprise the electronic device 107, a device management (DM) server 109, a provisioning server 129, a customer care server 157, and a download server 151. Although not illustrated in FIG. 1, a representative embodiment of the present invention may also comprise other application servers such as, for example, a diagnostics server, and a self-care website/portal. The electronic device 107 of FIG. 1 is able to communicate with the DM server 109, the download server 151, the customer care server 157, and the provisioning server 129 via communication paths 143, 153, 155 and 145, respectively. Although the communication paths 143, 153, 155, 145 are illustrated as being separate paths between the electronic device 107 and their respective servers, this is only for purpose of illustration, and is not a specific limitation of a representative embodiment of the present invention. The communication paths 143, 153, 155, 145 may be combined into one or more paths that may comprise wired or wireless communication paths such as, for example, a local area network, a public switched telephone network, a wireless personal, local or wide area network, and a cellular or paging network, to name only a few possibilities.

As illustrated in FIG. 1, an electronic device in accordance with a representative embodiment of the present invention may comprise a processor 166, random access memory (RAM) 165, and non-volatile memory (NVM) 111. The NVM 111 may comprise, for example, NAND or NOR type flash memory or other suitable type of NVM. The NVM 111 may contain a number of software/firmware code components of the electronic device 107 including, for example, application software 127, a device management (DM) client 163, an update package/update package array 116, a provisioning client 123, a hand-off module 121, an operating system (OS) 119, firmware 117, and one or more update agent(s) 115. Additional software/firmware code components may also be present in the RAM 165 and NVM 111. The term "code" may be used herein to represent one or more of executable instructions, operand data, configuration parameters, and other information stored in memory of the electronic device 107, and the term "update package catalog" may be used interchangeably with the term "update package array" to refer to received update information that comprises multiple update packages. The electronic device 107 may also comprise interface circuitry (not shown) to enable operable connection of a subscriber identity module (SIM) card 167, that may be employed in accordance with aspects of the present invention described later in this document.

In a representative embodiment of the present invention, an electronic device such as, for example, the electronic device 107 of FIG. 1 may employ an update package (e.g., the update package/update package array 116) delivered by a remote server such as, for example, the download server 151, to update firmware/software, data and configuration information in memory of the electronic device 107. Such an update package may comprise update information including, for example, metadata describing an update, checksums, and instructions executable by one or more update agents such as, for example, the update agent 115 of FIG. 1. The update agent 115 may process a set of executable instructions, which may be used as a compact means to encode differences between existing/first and updated/second versions of firmware, software, data, and configuration parameters for the electronic device 107. The executable instructions may be assembled into update packages to be transmitted to an electronic device for use in updating memory of the electronic device. Update agent(s) in the electronic device may process respective portions of the executable instructions from an update package to convert/transform corresponding portions of an existing/first version of code in memory of the electronic device 107 to portions of an updated/second version of code. The electronic device 107 may also receive provisioning information from, for example, the device management server 109, the customer care server 157, and/or the provisioning server 129 to fix configuration problems or reconfigure software and hardware.

In addition to those elements described above, the electronic device 107 may comprise a downloaded diagnostic client (not shown) that facilitates remote diagnosis, and a traps client (not shown) that facilitates the setting of traps and retrieving of collected information. The DM client 163 of the electronic device 107 may interact with the DM server 109, the diagnostic client, and the traps client, to receive DM commands from the DM server 109 and to implement them in the electronic device 107. The download server 151 may be employed to download firmware and software updates (e.g., update information in the form of, for example, update packages). The download server 151 may also be used to download new firmware/software such as, for example, the diagnostics client mentioned above, which may then be installed and activated in the electronic device 107.

As described briefly above, an electronic device in accordance with a representative embodiment of the present invention (e.g., electronic device 107) may receive update information (e.g., an update package) for processing by one or more update agents (e.g., update agent 115) to convert/transform software (e.g., application software 127) and/or firmware (e.g., firmware 117) to produce updated software/firmware in the electronic device. In some representative embodiments of the present invention, the update agent 115 may comprise multiple update agents, each of the update agents appropriately arranged to process different types of update information for updating different types/formats of software, firmware, user data, and configuration parameters in the memory of the electronic device 107. Each of the update packages received may be processed in the electronic device by an appropriate one of the update agent(s) 115 to update an associated type of information in the memory of the electronic device 107.

In a representative embodiment of the present invention, an Open Mobile Alliance (OMA) device management (DM)-based applications server may be composed of two parts, an OMA DM-based application, and an OMA DM server such as, for example, the DM server 109 shown in FIG. 1. An OMA DM-based application is mainly focused on business processes, logic, and data. An OMA DM server, however, is mainly focused on the functionality required to support the OMA DM protocol by which the OMA DM-based application manipulates OMA DM-capable electronic devices such as, for example, the electronic device 107 of FIG. 1.

Figure 2:
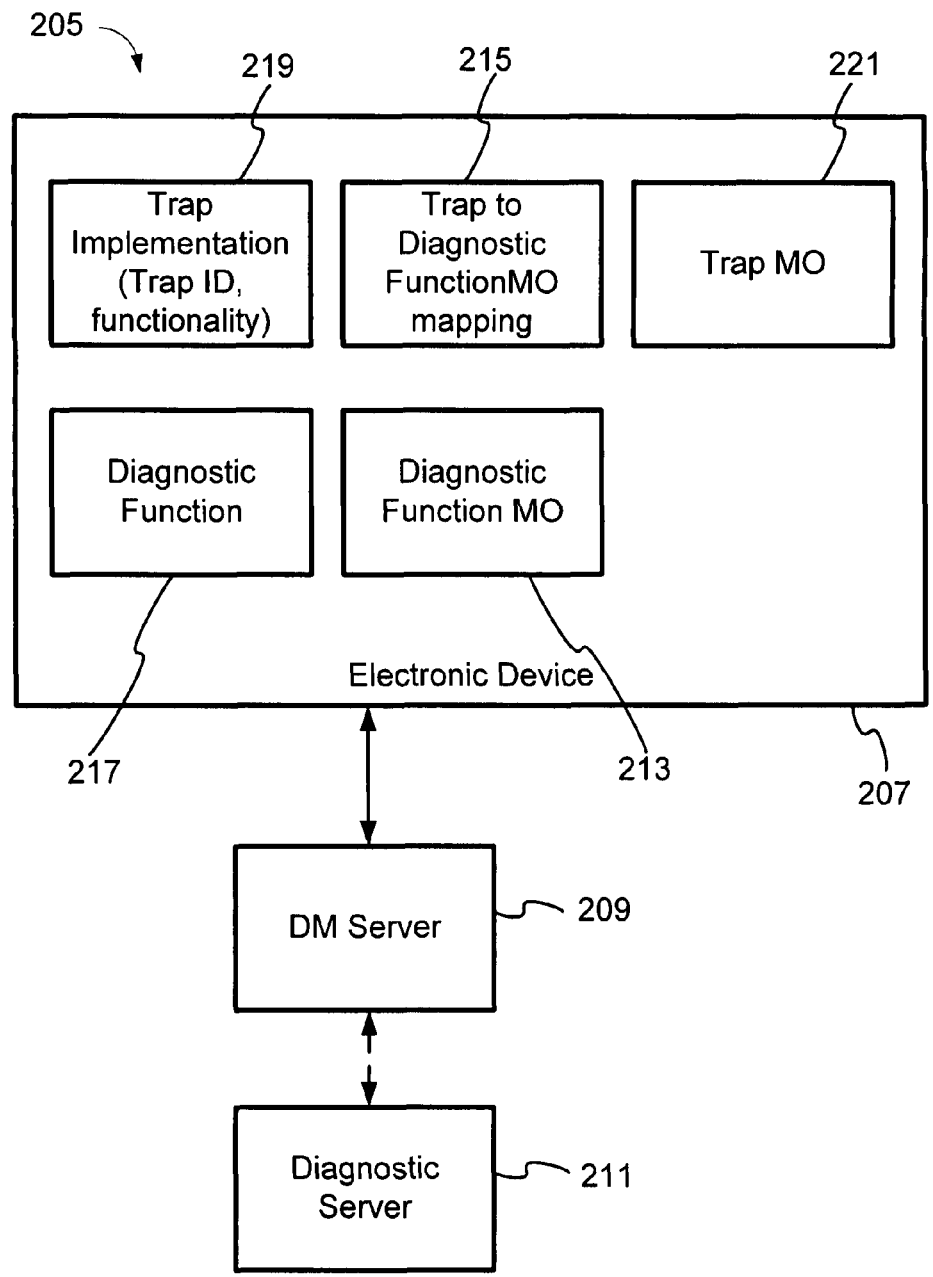
FIG. 2 is a perspective block diagram of a network that is capable of managing and diagnosing an electronic device that may correspond to, for example, the electronic device of FIG. 1 using diagnostics management objects (MOs) such as the trap management object and diagnostic function MO of FIG. 2, in accordance with a representative embodiment of the present invention.

FIG. 2 is a perspective block diagram of a network 205 that is capable of managing and diagnosing an electronic device 207 that may correspond to, for example, the electronic device 107 of FIG. 1 using diagnostics management objects (MOs) such as the trap management object 221 and diagnostic function MO 213 of FIG. 2, in accordance with a representative embodiment of the present invention. The network 205 of FIG. 2 comprises an electronic device 207 communicatively coupled to a device management (DM) server 209. Although only one electronic device 207 is illustrated in FIG. 2, this does not represent a specific limitation of the present invention, which may provide diagnostic and device management support for a greater number of electronic devices 207. The DM server 209 is shown in FIG. 2 communicatively coupled to a diagnostic server 211. The communication paths between the diagnostic server 211 and the DM server 209, and the DM server 209 and electronic device 207 may comprise wired or wireless links employed in the types of electronic devices described above including, for example, wireless networks such as cellular, paging and other wide area networks, wireless local area networks, and wired networks such as local area, Ethernet, and public switched telephone networks, to name only a few.

The electronic device 207 illustrated in FIG. 2 comprises support for invoking diagnostic functions 217 and setting traps 219 for remote diagnosis. The diagnostic functions 217 of FIG. 2 may be a part of the firmware of an electronic device (e.g., firmware 117 of electronic device 107 of FIG. 1), and may be made resident at time of manufacturer, or may be downloaded after manufacture using, for example, a wireless communication path, or a user interchangeable circuit card such as a subscriber identify module (SIM) card or smart card (e.g., the SIM card 167 of FIG. 1). The diagnostic functions 217 may be managed (e.g., started, terminated, enabled, disabled, deleted, etc.) using appropriate management objects (MOs) such as the diagnostic function management objects (MO) 213 shown in FIG. 2, either locally, or remotely by a device management server such as the DM server 209. The diagnostic function MO 213 may be accessed by the DM server 209, which may correspond, for example, to the DM server 109 of FIG. 1. The diagnostic function MO 213 provides a mechanism by which individual diagnostic functions in the electronic device 207 may be managed by instances of the diagnostic function MO 213.

The Trap MO 221 is a facade or a management interface to specific trap implementations 219 that may be associated with the occurrence of particular events in the electronic device 207. Individual Trap MOs 221 provide access to specific trap implementations 219. Each trap implementation 219 may comprise identification information or an identity such as, for example, a "Trap ID". Each trap implementation 219 may also provide trap functionality such as, for example, flagging a specific event that occurs in the electronic device 207.

If the occurrence of a particular event is of interest to, for example, the operator of the network 205 or the manufacturer of the electronic device 207, a trap implementation such as the trap implementation 219 may be provided in the electronic device 207. The trap implementation 219 may be accessible by means of an associated Trap MO such as, for example, the Trap MO 221 shown in FIG. 2. When an event associated with a trap occurs, the trap is said to have "fired" or "triggered". The firing/triggering of a trap may be reported by the electronic device 207 to a DM server such as the DM server 209, if the associated Trap MO 121 has been set and is currently enabled.

In a representative embodiment of the present invention, a trap MO such as the Trap MO 221 of FIG. 2 may, for example, be associated with a diagnostic function management object such as the diagnostic function MO 213 of FIG. 2. This association implies that a diagnostic function of the diagnostic function MO 213 is to be invoked when an associated trap (e.g., trap implementation 219) is fired/triggered. Thus, the Trap Mo 221 may be mapped to an associated diagnostic function MO (e.g., diagnostic function MO 213) in the electronic device 207, such that the diagnostic function MO 213 is invoked when the trap MO 221 is fired/triggered (i.e., the associated event of interest occurs). A representative embodiment of the present invention may employ a trap-to-diagnostic function MO mapping 215 to maintain the information on what diagnostic function MO 215 is to be invoked when a specific trap associated with a Trap MO 121 is fired/triggered.

A diagnostic function MO in accordance with a representative embodiment of the present invention such as, for example, the diagnostic function MO 213 may also be directly invoked by a device management server such as the DM server 209. When this occurs, a diagnostic function MO (e.g., diagnostic function MO 213) may invoke an associated diagnostic function (e.g., diagnostic function 217), that may collect data and report results. In one representative embodiment of the present invention, collection of data or measurements may occur according to a collection method provided in the diagnostic function MO (e.g., diagnostic function MO 213). In another representative embodiment of the present invention, a collection method may be implemented in the diagnostic function itself (e.g., diagnostic function 217) by default. In a representative embodiment of the present invention, reporting of collected data or measurements may occur according to a reporting method provided by the diagnostic function MO (e.g., diagnostic function MO 213), as a default behavior implemented in the diagnostic function, or per a policy set in the electronic device 207, for example.

A representative embodiment of the present invention may employ a device management (DM) technique, wherein diagnostics management objects (e.g., diagnostic function MO 213 and/or trap MO 221) are created and used for detecting and resolving problems with specific device features and/or applications in a network such as the network 205. Using diagnostics MOs (e.g., diagnostic function MO 213 and trap MO 221) in accordance with a representative embodiment of the present invention, a network such as the network 205 may find appropriate solution(s) for problems based on diagnostics information received from an electronic device such as the electronic device 207.

Figure 3:
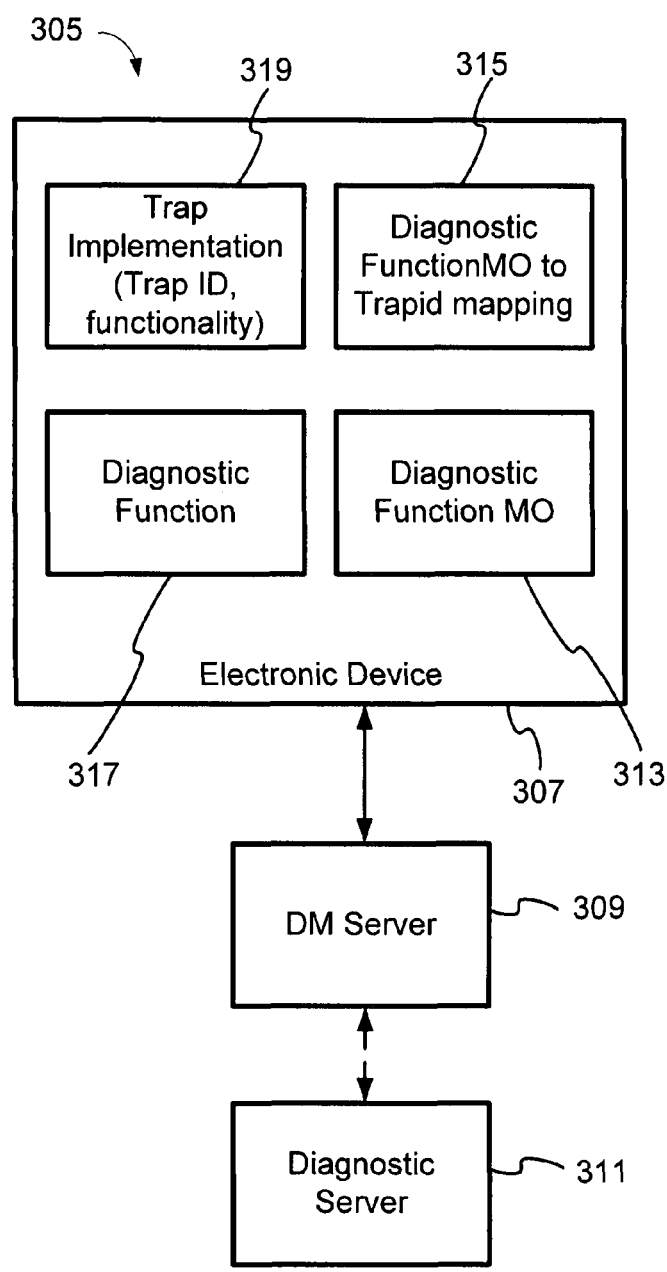
FIG. 3 is a perspective block diagram of an exemplary network that supports management and diagnosis of an electronic device that may correspond, for example, to the electronic devices of FIGS. 1 and 2, in which the electronic device supports invoking diagnostic functions and setting traps for remote diagnosis, in accordance with a representative embodiment of the present invention.

FIG. 3 is a perspective block diagram of an exemplary network 305 that supports management and diagnosis of an electronic device 307 that may correspond, for example, to the electronic devices 107, 207 of FIGS. 1 and 2, in which the electronic device 307 supports invoking diagnostic functions 317 and setting traps 319 for remote diagnosis, in accordance with a representative embodiment of the present invention. As in the illustration of FIG. 2, the exemplary network 305 of FIG. 3 comprises an electronic device 307 communicatively coupled to a device management (DM) server 309. Although FIG. 3 shows only one electronic device 307, a representative embodiment of the present invention may provide diagnostic and device management support for a greater number of electronic devices 307. As shown in FIG. 3, the DM server 309 is communicatively coupled to a diagnostic server 311 by a wired or wireless path. Electronic device 307 and DM server 309 are also in communication over a wired or wireless path. Such communication paths may include wireless networks such as cellular, paging and other wide area networks, wireless local area networks, and wired networks such as local area, Ethernet, and public switched telephone networks, as appropriate.

In a representative embodiment of the present invention, the electronic device 307 may support invoking diagnostic functions 317 and the setting of traps 319 for remote diagnosis. The diagnostic functions 317 of FIG. 3 may be firmware resident (e.g., firmware 117 of electronic device 107 of FIG. 1), installed at time of manufacturer, and/or may be added/updated after manufacture via a wired or wireless communication path. A user interchangeable circuit card such as a smart card (also referred to herein as a "Smartcard") and/or subscriber identify module (SIM) card (e.g., the SIM card 167 of FIG. 1) may also provide such diagnostic functions 317.

The diagnostic functions 317 may be managed (e.g., started, terminated, enabled, disabled, deleted, etc.) using appropriate diagnostic function management objects (MO) 313. The diagnostic function MOs (e.g. diagnostic function MO 313) may refer to appropriate trap implementations (e.g., trap implementation 319) for which they are invoked. Each trap and trap implementation 319 may have an associated "Trap ID". In a representative embodiment of the present invention, any given diagnostic function MO 313 may refer to one or more Trap IDs. This implies that those Trap IDs are of interest. Whenever a trap having one of the referenced Trap IDs occurs (i.e., fires/triggers), each of the diagnostic function MOs 313 making reference to the Trap ID of the fired/triggered trap may be invoked. Thus, an electronic device in accordance with a representative embodiment of the present invention (e.g., electronic device 307) may maintain a diagnostic function MO-to-Trap ID mapping 315, which enables associating specific diagnostic function MOs (e.g., diagnostic function MO 313) with one or more Trap IDs that are of interest. A DM server (e.g., the DM server 309) may set Trap IDs of interest in instances of the diagnostic function MOs 313.

Figure 4:
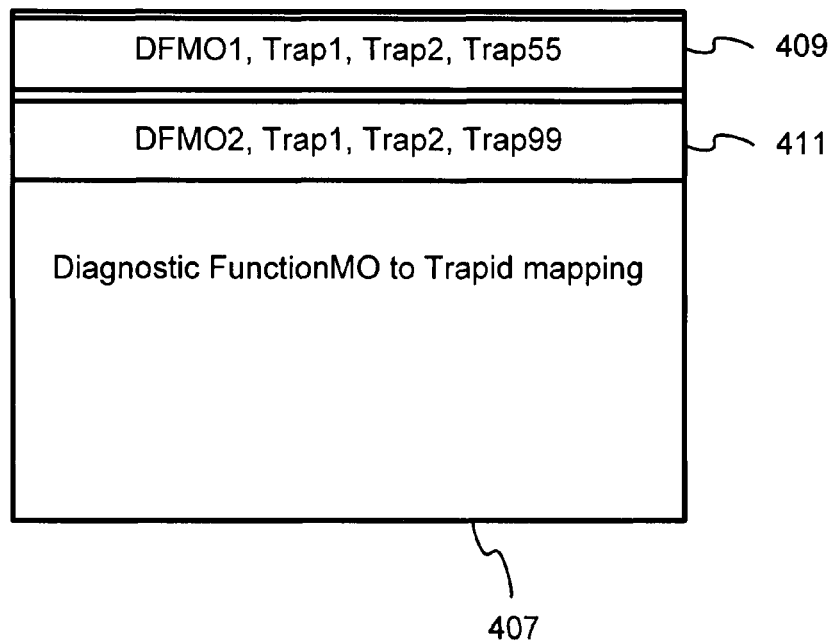
FIG. 4 is a perspective block diagram of an exemplary data structure in an electronic device that may correspond to, for example, the electronic devices of FIGS. 1, 2, 3, which may be used to maintain and track mapping(s) of diagnostic function MOs to specific trap IDs, in accordance with a representative embodiment of the preset invention.

FIG. 4 is a perspective block diagram of an exemplary data structure 407 in an electronic device that may correspond to, for example, the electronic devices 102, 207, 307 of FIGS. 1, 2, 3, that may be used to maintain and track mapping(s) of diagnostic function MOs to specific trap IDs, in accordance with a representative embodiment of the preset invention. As show in the example of FIG. 4, the data structure 407 for such a mapping may be recorded in, for example, a table comprising entries for each diagnostic function MO, each entry comprising a list of associated Trap IDs. For example, an entry 409 in the mapping table 407 may be used to indicate that a diagnostic function MO "DFMO1" is to be invoked if any of the traps Trap1, Trap2, and/or Trap55 are fired/triggered (i.e. events associated with them are encountered). The mapping table 407 also shows an entry for a second diagnostic function MO "DFMO2" that is to be invoked when any of traps Trap1, Trap2 and/or Trap99 are fired/triggered. Although the exemplary mapping table 407 of FIG. 4 shows only two associations of a diagnostic function MO to one or more Trap IDs, this does not represent a specific limitation of a representative embodiment of the present invention. A mapping of diagnostic function MOs to Trap IDs in accordance with a representative embodiment of the present invention may associate only one, or a larger number of diagnostic function MOs to Trap IDs than that shown in FIG. 4, without departing from the scope of the present invention.

Figure 5:
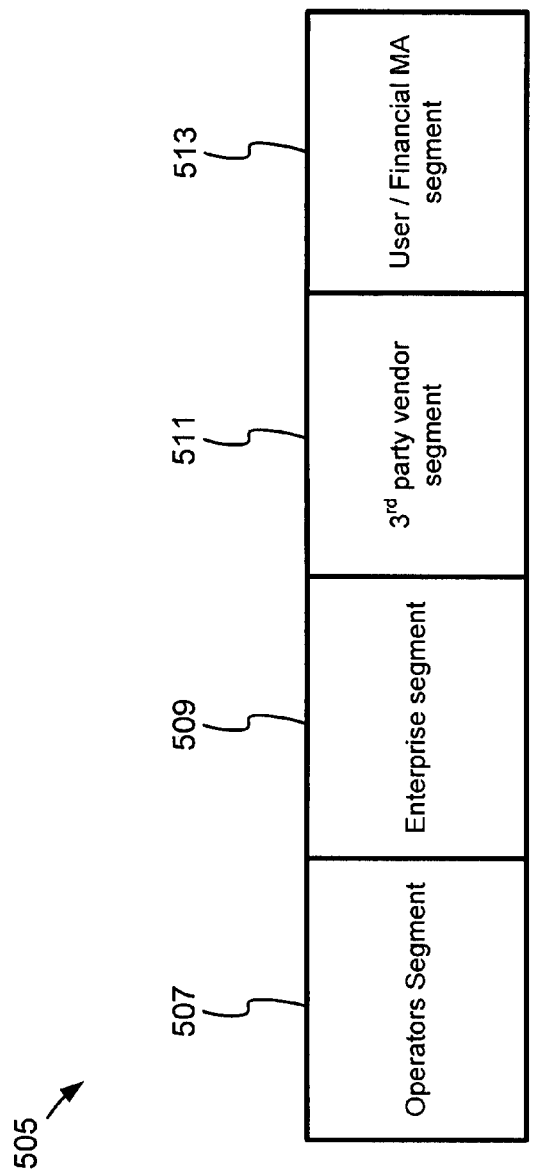
FIG. 5 is a perspective block diagram of an exemplary subscriber identity module (SIM)/Smartcard layout wherein information associated with multiple management authorities are segmented for device management purposes, in accordance with a representative embodiment of the present invention.

FIG. 5 is a perspective block diagram of an exemplary subscriber identity module (SIM)/Smartcard layout 505 wherein information associated with multiple management authorities 507, 509, 511, 513 are segmented for device management purposes, in accordance with a representative embodiment of the present invention. The SIM/Smartcard layout 505 of FIG. 5 comprises a plurality of segments 507, 509, 511, 513 that may be separately managed by different management authorities. A management authority may be an entity such as, for example, a network/system operator, a manufacturer of an electronic device like electronic devices 107, 207, 307 of FIGS. 1, 2, 3, and/or a $3^{rd}$ party vendor that manages a portion of the information stored in a SIM/Smartcard such as, for example, the SIM card 167 of FIG. 1. A representative embodiment of the present invention may employ a SIM card segmentation such as that illustrated by the SIM/Smartcard layout 505 of FIG. 5, to provide security isolation employing, for example, different encryption keys for each of the segments 507, 509, 511, 513. In a representative embodiment of the present invention, the segments 507, 509, 511, 513 may be incorporated as portions of a device management tree in an electronic device such as the electronic devices 107, 207, 307 of FIGS. 1, 2, 3. Such a DM tree may, for example, be compliant with the Open Mobile Alliance (OMA) device management (DM) version 1.2 specification developed under the auspices of the Open Mobile Alliance, Ltd. Each segment in a SIM/Smartcard layout such as the segments 507, 509, 511, 513 of the exemplary SIM/Smartcard layout 505 shown in FIG. 5 may be incorporated into the device management tree of an electronic device (e.g. electronic device 107) based on a set of policies. These separate segments of a device management tree may have individually controllable access control list (ACL) rights to corresponding management objects in device management tree.

In one representative embodiment of the present invention, a SIM/Smartcard layout such as the SIM/Smartcard layout 505 may comprise an operator's segment 507 that provides system/network operator-specific provisioning and management data. A SIM/Smartcard layout such as the SIM/Smartcard layout 505 may also comprise an enterprise segment 509 that provides data and device management objects (that may include, for example, provisioning data) that are managed by and/or associated with an enterprise/organization having a number of member/employee users. The SIM/Smartcard layout 505 may also comprise a 3rd party vendor segment 511 that provides information such as, for example, account information, warranty information, and run-time parameters associated with 3rd party software that may be installed at time of manufacture or issue, and/or subsequently downloaded to the electronic device. A SIM/Smartcard layout in accordance with a representative embodiment of the present invention may also comprise a user/financial management authority segment 513 comprising financial information such as, for example, bank account information, banking network access information, and/or billing information.

Figure 6:
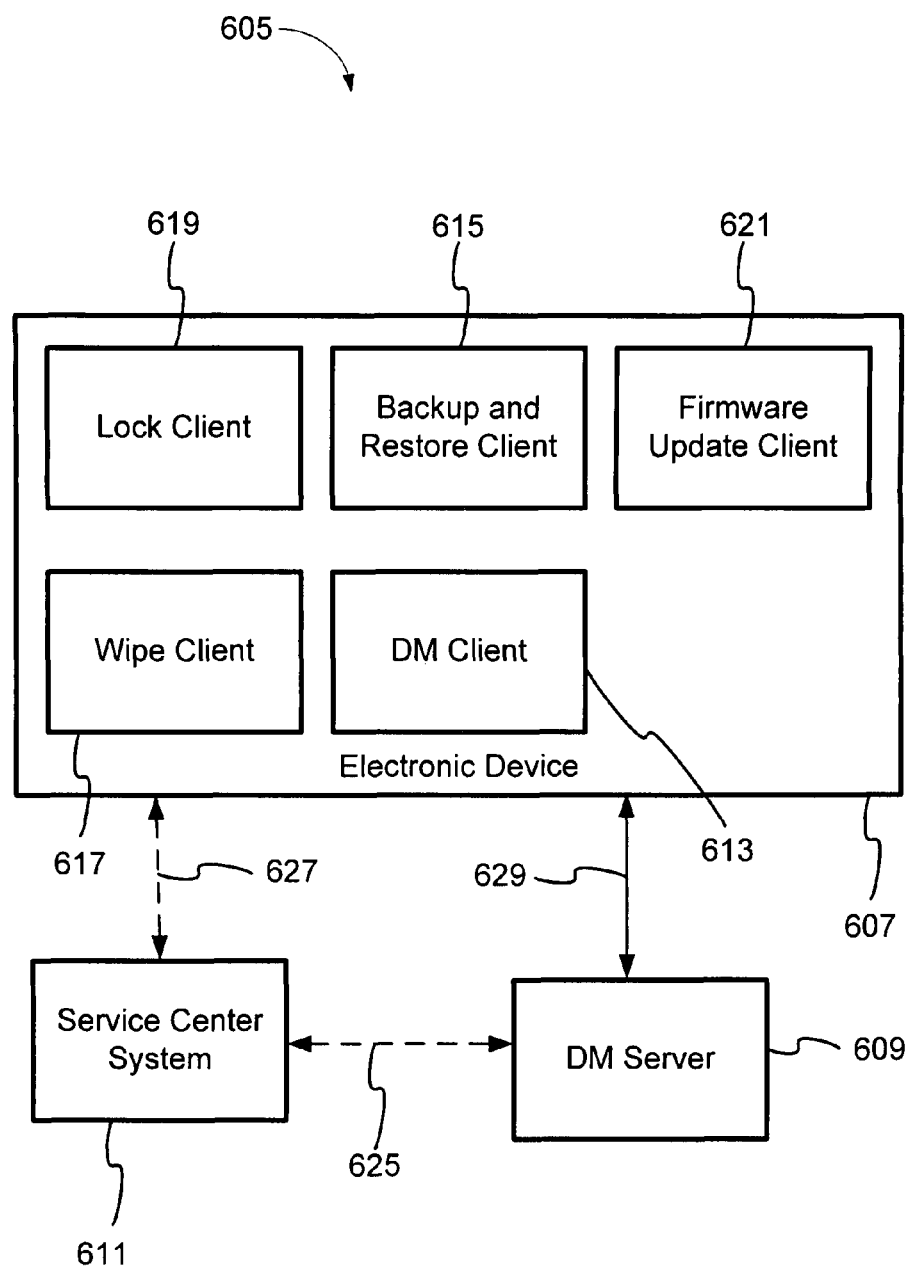
FIG. 6 is a perspective block diagram of an exemplary device management network that facilitates terminal management activities for an electronic device by a DM server, in accordance with a representative embodiment of the present invention.

FIG. 6 is a perspective block diagram of an exemplary device management network 605 that facilitates terminal management activities for an electronic device 607 by a DM server 609, in accordance with a representative embodiment of the present invention. The electronic device 607 may correspond to the electronic devices 107, 207, 307, and the DM server 609 may correspond to the DM servers 109, 209, 309, of FIGS. 1, 2, 3, for example. The electronic device 607 and DM server 609 may be communicatively coupled via a communication path 629 that may comprise any of the wired and/or wireless networks described above with respect to FIGS. 1, 2 and 3. As shown in FIG. 6, the network 605 may also comprise a service center system 611 that may be communicatively coupled to the DM server 609, via communication path 625, and/or to the electronic device 607, via communication path 627. The communication paths 625, 627 may comprises any of the wired and/or wireless links such as those described above.

In a representative embodiment of the present invention, the electronic device 607 may, for example, comprise a firmware update client 621, a backup and restore client 615, a DM client 613, a lock client 619 and a wipe client 617. Each of these clients 621, 615, 613, 619, 617 may comprise firmware/software that was installed in the electronic device 607 at time of manufacture, or later downloaded/transferred in one of the manners described above.

A fundamental problem exists in a wireless network such as the network 605 of FIG. 6, in which a service center like that represented by service center system 611 receives electronic devices (e.g., electronic device 607) that may contain user and other sensitive data such as, for example, corporate data still available on the electronic device 607. A service center using a service center system 611 may replace electronic devices (e.g., electronic device 607) return/brought in by a subscriber with other refurbished electronic devices that may have been returned by other subscribers for various reasons. This reuse of electronic devices like the electronic device 607, for example, may permit a new user of a refurbished electronic device to have access to private data of the previous owner/user of the electronic device. Both the electronic device (e.g. electronic device 607) returned by the subscriber and the replacement electronic device provided to the subscriber may have legacy user/corporate proprietary data on them, making it possible for confidential legacy user/corporate proprietary/network data to fall into unauthorized hands. A network in accordance with a representative embodiment of the present invention such as, for example, the network 605 makes it possible to wipe or cleanse memory of an electronic device such as the electronic device 607, in order to erase/remove such data from the memory of the electronic device. In a representative embodiment of the present invention, such wiping/cleansing may be performed when, for example, the electronic device 607 is brought into a service center and registered with a service center system such as the service center system 611, for example. The service center system 611 may capture information from the electronic device, and may instruct a DM server such as, for example, the DM server 609 to either lock the electronic device 607 to prevent further use of the device, may wipe/erase memory in the electronic device 607 by removing all user, corporate, and/or network data, or may conduct a combination of the two operations.

In a representative embodiment of the present invention, the service center system 611 may employ a DM server such as the DM server 609 to send over-the-air instructions to the electronic device 607 to wipe its memory clean. This act may employ client software/firmware such as, for example, the wipe client 617 of FIG. 6. The electronic device 607 may also be instructed to lock itself using client software/firmware such as the lock client 619 of FIG. 6. In a representative embodiment of the present invention, the service center system 611 may employ terminal/device management objects (MOs) such as a Lock MO and a Wipe MO (both not shown in FIG. 6), to invoke the lock and wipe operations described above on the electronic device 607. In a representative embodiment of the present invention, such lock and wipe operations may be asynchronous. A DM server such as, for example, the DM server 609 may employ a device management protocol such as the Open Mobile Alliance (OMA) device management (DM) protocol previously described, or extensions to such a protocol, to interact with a device management client like the exemplary DM client 613 shown in the illustration of FIG. 6. The service center system 611 may receive results from the DM server 609 upon the completion of the requested operations, indicating success or failure of the wipe and/or lock operations. In a representative embodiment of the present invention, the service center system 611 may employ a web services interface via communication path 625 to interact with the DM server 609, and may use appropriate authentication and authorization parameters.

In a representative embodiment of the present invention, the service center system 611 may employ the DM server 609, via a web services interface over communication path 625, to interact with the electronic device 607 so as to invoke the wipe client 617 and/or the lock client 619. Each of the wipe client 617 and lock client 619 may have an associated management object. Such device management objects may reside in a device management tree that may be accessed using a device management protocol such as the OMA DM protocol previously discussed. The DM server 609 may invoke actions of the wipe client 617 and/or the lock client 619 by accessing their respective MOs. A representative embodiment of the present invention may also support invocation of other clients in the electronic device including, for example, the backup and restore client 615, which may be used to backup configuration, account information, management objects, user data, and corporate data, for example, via the DM server 609. Such a backup activity may be used to enable a subsequent restore onto the same electronic device (e.g., after a bug fix or a device "factory reset") or onto a replacement electronic device.

In one representative embodiment of the present invention, the service center system 611 may employ a communication path 627 comprising a cabled communication means such as, for example, a universal serial bus (USB) cable, to interact with the electronic device 607 so as to invoke the wipe client 617 and/or the lock client 619. Such a wired communication path may also be used to invoke other clients such as, for example, the backup and restore client 615 discussed above, to backup configuration, account information, management objects, user data, and corporate data, for example.

In a representative embodiment of the present invention, a wipe client such as, for example, the wipe client 617 may be invoked to erase content on the electronic device 607. The wipe client 617 may be invoked over-the-air, via the DM server 609. In some representative embodiments of the present invention, the wipe client 617 may be arranged to delete all user data, while in other representative embodiments the wipe client 617 may be arranged to erase a variety of different types of content that may exist on the electronic device 607. For example, the wipe client 617 may be used to automatically erase user data, ring tones that may be obscene, and old confidential data that should not be seen by others, to name a few examples.

In accordance with a representative embodiment of the present invention, when a subscriber returns an electronic device such as the electronic device 607 of FIG. 6, a service center (e.g., the service center having service center system 611) may erase all ring tones on the electronic device. This may be done for two reasons. First, ring tones may be removed as a precaution, in case they may be considered to be offensive to the next subscriber that uses the electronic device. Second, ring tones may be removed to ensure that content paid for by one subscriber (and for which a digital rights management object may have been acquired) is not inadvertently used by another subscriber who has not paid for the rights to use it.

In one representative embodiment of the present invention, a client such as the firmware update client 621 may incorporate the features of the lock client 619 and/or the wipe client 617. Such an embodiment may be enabled to process software/firmware updates to the electronic device 607, and to erase user data. The firmware update client 621 may wipe the electronic device clean of other data including, for example, ring tones, screen savers, and "wallpaper", and to lock the electronic device 607 from subsequent usage until the lock is subsequently reset or removed.

In a representative embodiment of the present invention, a DM server such as the DM server 609 may notice that a new device has been registered with the DM server (e.g., a new international mobile equipment identity (IMEI)/mobile station integrated services digital network (MSISDN) pair may be is discovered or registered) by an electronic device such as the electronic device 607 of FIG. 6. Such discovery/registration may occur, for example, during a DM session in which the DM server 609 conducts an "activation" operation on the "new" electronic devicev607. The DM server may conduct a "wipe and clean" operation during such an activation, removing/erasing selected areas of memory in the electronic device 607.

In some representative embodiments of the present invention, a service center employing a service center system such as, for example, the service center system 611 conducts depersonalization on the electronic device 607, to return the electronic device 607 to a standard form (e.g., with factory settings), when the electronic device 607 is returned to the service center by a subscriber and registered with the service center system 611.

Figure 7:
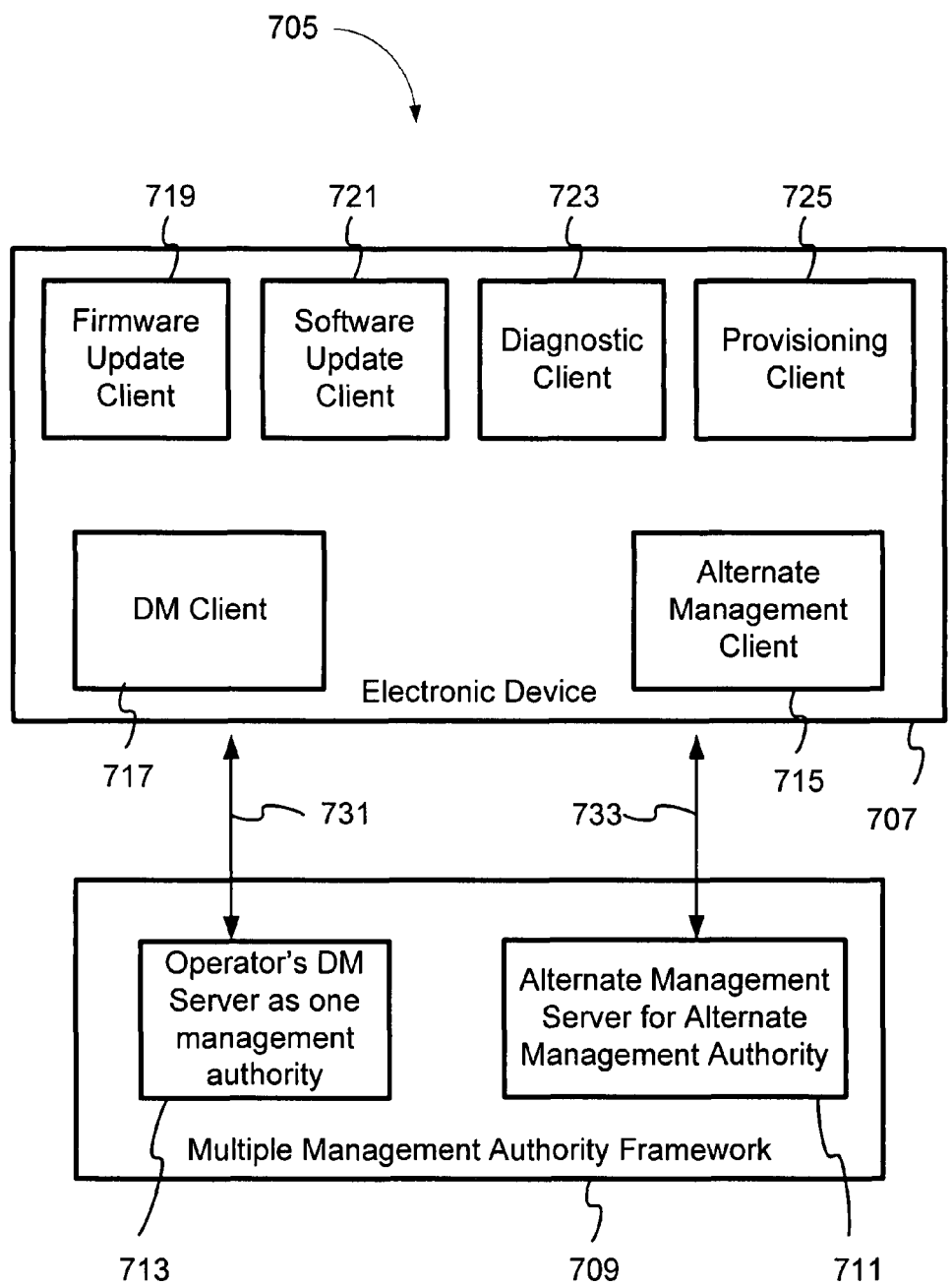
FIG. 7 is a perspective block diagram of an exemplary device management network in which multiple management authorities are supported.

FIG. 7 is a perspective block diagram of an exemplary device management network 705 in which multiple management authorities 711, 713 are supported, in according with a representative embodiment of the present invention. As shown in the example of FIG. 7, a representative embodiment of present invention comprises a multiple management authority framework 709 communicatively coupled to one or more electronic devices 707. The multiple management authority framework 709 comprises an operator's DM server 713 that acts as one management authority, and an alternate management server 711 that acts as an alternate management authority. Although only one alternate management server 711 is shown in FIG. 7, this does not represent a specific limitation of a representative embodiment of the present invention, a greater number of alternate management servers with alternate management authorities may be employed, without departing from the scope of a representative embodiment of the present invention. For example, the multiple management authority framework 709 supports one or more additional alternate management servers 711 such as an enterprise DM server for an enterprise management authority.

As shown in FIG. 7, an electronic device (e.g., electronic device 707) in accordance with a representative embodiment of the present invention comprises a DM client 717 that may correspond to, for example, the DM client 163 of FIG. 1, and an alternate management client 715. Representative embodiments of the present invention may also comprise a firmware update client 719, software update client 721, diagnostic client 723, and provisioning client 725.

In a representative embodiment of the present invention, the alternate management server 711 interacts with the alternate management client 715 in the electronic device 707, using a management protocol 733. Elements of the management protocol 733 may be exchanged over a wired or wireless communication path such as those described above with respect to electronic device 107, for example. In some representative embodiments of the present invention, the management protocol 733 is different from the OMA-DM protocol 731 employed by the operator's DM server 713 to interact with the DM client 717 in the electronic device 707. In other representative embodiments of the present invention, the management protocol 733 is the same as the OMA-DM protocol 731, and the DM client 717 and the alternate management client 715 are combined, and may operate on the same server.

In some representative embodiments of the present invention, both the DM client 717 and the alternate management client 715 employ the same client side agents to conduct device management operations on the electronic device 707. For example, the DM client 717 and the alternate management client 715 may both invoke the firmware update client 719 for firmware updates, the software update client 721 to conduct software component management (and software updates), the diagnostic client 723 to conduct device diagnostics and device monitoring, and the provisioning client 725 to conduct provisioning of the electronic device 707. Provisioning of the electronic device 707 may comprise, for example, client provisioning and/or continuous provisioning.

In one representative embodiment of the present invention, the DM client 717 of electronic device 707 maintains a management tree (not shown) in the memory of the electronic device 707, for device management purposes. In some representative embodiments of the present invention, such a device management tree is compatible with the Open Mobile Alliance (OMA) device management (DM) version 1.2 protocol. The device management tree is managed by the operator's DM server 713. An alternate management client such as the alternate management client 715 may maintain a different (logical) management tree for device management purposes that is managed by the alternate management server 711. In some representative embodiments of the present invention, multiple management trees are combined into one overall logical management tree by the electronic device 707, but with total isolation between the sub-trees. Such isolation is not restricted solely to visibility of the sub-trees from the perspective of the operator's DM server 713 and any alternate management servers 711 that may be used, but also extends to access control and security aspects as well.

Figure 8:
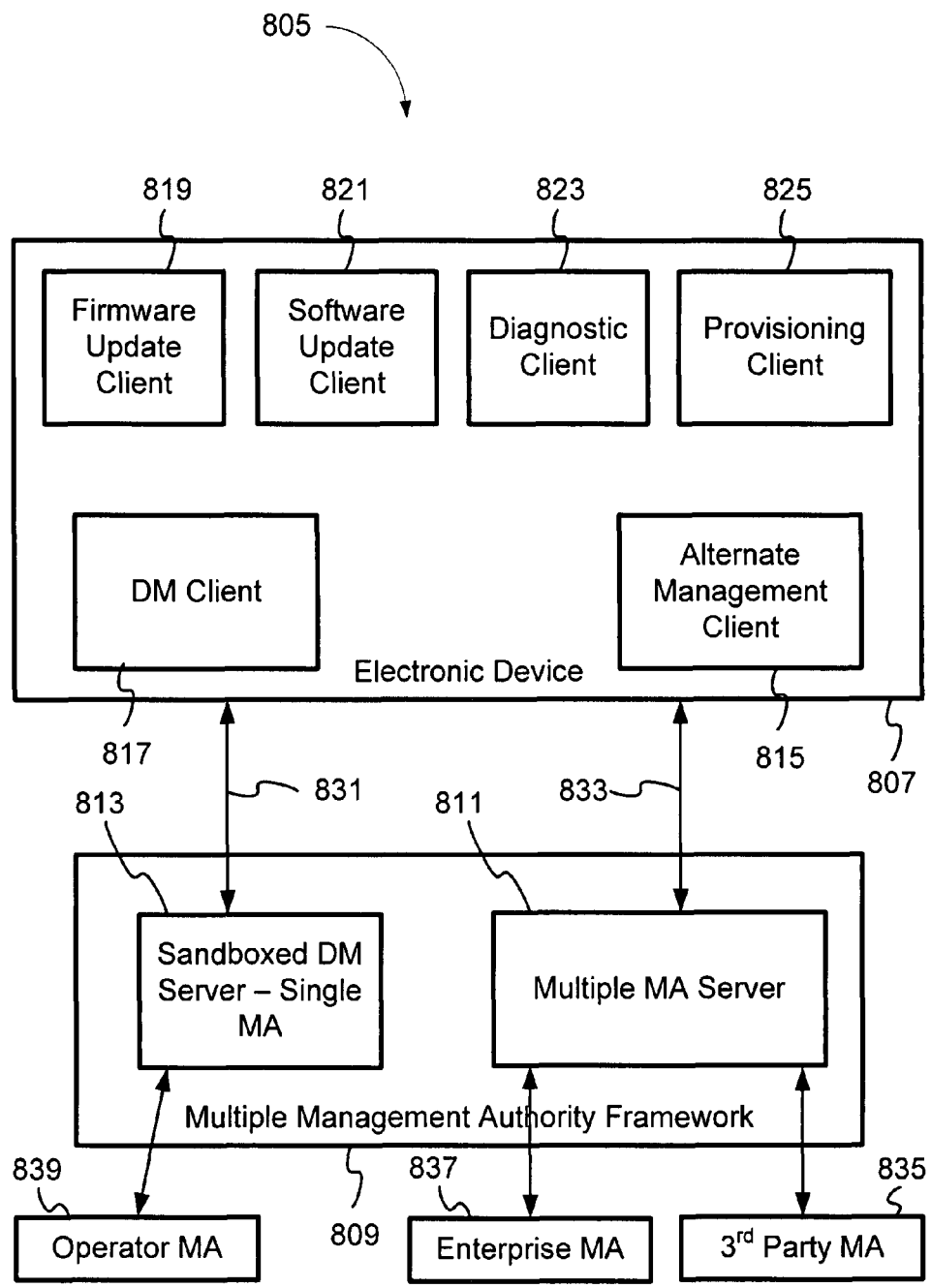
FIG. 8 is a perspective block diagram of an exemplary device management network that supports multiple management authorities using a multiple management authority framework, in accordance with a representative embodiment of the present invention.

FIG. 8 is a perspective block diagram of an exemplary device management network 805 that supports multiple management authorities using a multiple management authority framework 809, in accordance with a representative embodiment of the present invention. The device management network of FIG. 8 comprises an electronic device 808, and the multiple management authority framework 809. The electronic device 807 of FIG. 8, which may correspond to the electronic devices 107, 707 of FIGS. 1 and 7, for example, comprises a DM client 817 and an alternate management client 815. The electronic device 807 of FIG. 8 also comprises a firmware update client 819, a software update client 821, a diagnostic client 823, and a provisioning client 825. As illustrated in FIG. 8, the DM client 817 interacts with a sandboxed DM server 813 that operates on behalf of a single management authority, such as an operator's management authority system 839. The alternate management client 815 in the electronic device 807 interacts with a multiple management authority server 811 that supports multiple management authorities such as, for example, the enterprise management authority system 837 and the 3rd party management authority system 835 shown in FIG. 8.

The multiple management authority framework 809 in a representative embodiment of the present invention makes it possible to "sandbox" the DM server 813 that a management authority (e.g., an operator of the device management network 805) might use. The multiple management authority framework 809 provides isolation between the management tasks conducted by the sandboxed DM server 813, and those conducted by the multiple management authority server 711. Such isolation is not restricted to, for example, visibility of configurations, settings, and security parameters, but also to management operations initiated such as diagnostics and firmware updates.

In a representative embodiment of the present invention, the multiple management authority framework 809 coordinates execution of management activities that may be simultaneously initiated by both the sandboxed DM server 813 and those conducted by the multiple management authority server 811, especially in situations where such operations are likely to negatively impact the electronic device 807 or the user experience. For example, if a firmware update by the sandboxed DM server 813 is scheduled to overlap with a software component update by the multiple management authority server 811, the multiple management authority server 811 may modify the scheduling of such operations to avoid conflicts, or may warn the sandboxed DM server 813 and the multiple management authority server 811 on the existence of potential conflicts.

In some representative embodiments of the present invention, the device management network 805 supports personalization by a subscriber of the configurations and "look and feel" of an electronic device such as the electronic device 807. Some examples of personalization features include:

a) a DM server such as the DM Server 813 or the alternate management server 811 proactively pushing content, firmware, software, and settings to the electronic device 807, based on personalized preferences of a user, b) a personalization agent in the electronic device 807 such as, for example, the DM client 817 proactively pulling content to the electronic device 707, c) aggregation and rating of mobile service offerings, d) correlation of rated mobile service offerings with personalized preferences of a user, e) a simplified user interface on the electronic device to aid a user in inputting personalized preferences, f) use of voice recognition for inputting personalized preferences, g) using one or more algorithms to automatically create targeted services and features based on a few personalized preference inputs.

Personalization of an electronic device, in accordance with a representative embodiment of the present invention, empowers subscribers to personalized selection of electronic device hardware, software, and content. Features of an electronic device such as, for example, the electronic device 107 of FIG. 1 may be targeted and administered at the individual subscriber level. A subscriber may embed in the electronic device only those features that they will use. In one representative embodiment of the present invention, user preferences are stored on a device management server such as the device management server 109 of FIG. 1. User preferences may also be stored in an alternate management server such as the exemplary alternate management server 711 of FIG. 1. User preferences may be provided by a subscriber via a client in the electronic device (e.g., the DM client 163 of FIG. 1), via a web portal and web browser, or via activation during a call to a customer care representative. The device management server (E.G., one or more of the multiple management authority server 811 of FIG. 8) may retrieve and compile information tailored to the user based on the stored preferences. The compiled information may then be pushed to the electronic device of the user (e.g., electronic device 807), and the user of the electronic device may be notified of its availability.

A device management network in accordance with the present invention such as the exemplary device management network 805 shown in FIG. 8 supports, for example, concierge-type services. The following example illustrates one possible scenario supported by a representative embodiment of the present invention. Upon activation of an electronic device such as the electronic device 807, a device management server such as, for example, the multiple management authority server 811 of FIG. 8 may cause a prompt message to be displayed on the electronic device, asking whether the user would like to personalize the electronic device. If the user agrees, the user may be presented with a list of available interests including, for example, themes such as sports (e.g., FIFA World Cup soccer, NASCAR), parenting, movies, music (e.g., bands, venues), shopping, professions and special interests. A user may select a pre-packaged theme or interest from the list, and may then be presented with additional details to narrow the user selection. The selected interest may then be stored on a device management server such as the multiple management authority server 811 of FIG. 8, for example. Based on that selected preference, the electronic device of the subscriber may then receive an initial setup transaction updating firmware, software and settings (e.g., user interface or "skins") of the electronic device with personalization packages for the selected preference. Later, the subscriber may be periodically notified of the availability of updates, according to any subscriptions in effect. This may include, for example, new applications, activities with subscribers that have indicated similar interests, scoring and statistics for games and tournaments, and advertising relating to "brick and mortar" vendors of goods and/or services related to the subscriber's preferences. Information for such notifications may be pro-actively retrieved and personalize based on the user preferences stored in, for example, the multiple management authority server 811, and may be delivered in the form of firmware/software/applications for the electronic device, alerts and advertising, and may include streaming forms of media content. By personalizing the electronic device 807, and providing information to a subscriber based upon user preferences, a representative embodiment of the present invention provides only relevant data and minimizes user interaction. The latter may be important to a subscriber, due to the fact that most electronic devices in mass use for the delivery of services and application (e.g., cellular phones, personal digital assistants, personal computers, and pagers) have limited input capabilities. Delivery of information may be via a TCP/IP connection, or via short message service (SMS). Mobile-originated device management sessions may be employed to track electronic device such as the electronic device 807.

A representative embodiment of the present invention provides a user-friendly way to personalize an electronic device such as the electronic device 107 of FIG. 1. This personalization may be supported using automated fetch of features, provisioning and content, based on stored user preferences. Targeted advertising is also enabled by a representative embodiment of the present invention, using preference-based advertising. In some representative embodiments of the present invention, a device management server such as the multiple management authority server 811 of FIG. 8 provides a "most popular" or "what's hot" option, that can be used to actively provide the most popular applications and content, for example. Users may share preferences with other users via, for example, a "send to a friend" functionality, enabling the spread of information and growth of common interest groups. Preferences may also be shared on community services/social web sites.

In some representative embodiments of the present invention, the device management network 805 supports graphical alerts. This feature may use, for example, OMA-DM Alert Codes to produce graphical alerts in the electronic device 807, rather than employing simple text-only messages. This feature is useful for several different applications including, for example:
 A) Server pushing instructional information with graphics,
 B) Server pushing advertising.

A DM server such as the multiple management authority server 811 of FIG. 8 in a representative embodiment of the present invention may invoke a graphical alert in the device 807 comprises by sending an OMA-DM message, such as the extensible markup language (XML) example shown in Listing 1, below.

LISTING 1.

```
<Alert>
<CmdID>2</CmdID>
<Data>1100</Data>
<Item><Data>MINDT=10</Data></Item>
<Item>
<Meta>
<Format xmlns="syncml:metinf">b64</Format>
<Type xmlns="syncml:metinf">image/jpeg</Type>
<Size xmlns="syncml:metinf">37214</Size>
</Meta>
<Data>[binary image data]</Data>
</Item>
</Alert>
```

A device management network in accordance with a representative embodiment of the present invention such as, for example, the device management network 805, may support multiple choices using, for example, the XML sequence shown in Listing 2, below.

LISTING 2.

```
<Alert>
<CmdID>2</CmdID>
<Data>1104</Data>
<Item></Item>
<Item><Data>Select service to configure</Data></Item>
<Item>
<Meta>
<Format xmlns="syncml:metinf">b64</Format>
<Type xmlns="syncml:metinf">image/jpeg</Type>
<Size xmlns="syncml:metinf">37214</Size>
</Meta>
<Data>[binary image data1]</Data>
</Item>
<Item>
<Meta>
<Format xmlns="syncml:metinf">b64</Format>
<Type xmlns="syncml:metinf">image/jpeg</Type>
<Size xmlns="syncml:metinf">37214</Size>
</Meta>
<Data>[binary image data2]</Data>
</Item>
<Item>
<Meta>
<Format xmlns="syncml:metinf">b64</Format>
<Type xmlns="syncml:metinf">image/jpeg</Type>
<Size xmlns="syncml:metinf">37214</Size>
</Meta>
<Data>[binary image data3]</Data>
</Item>
<Item>
<Meta>
<Format xmlns="syncml:metinf">b64</Format>
<Type xmlns="syncml:metinf">image/jpeg</Type>
<Size xmlns="syncml:metinf">37214</Size>
</Meta>
<Data>[binary image data4]</Data>
</Item>
</Alert>
```

Figure 9:
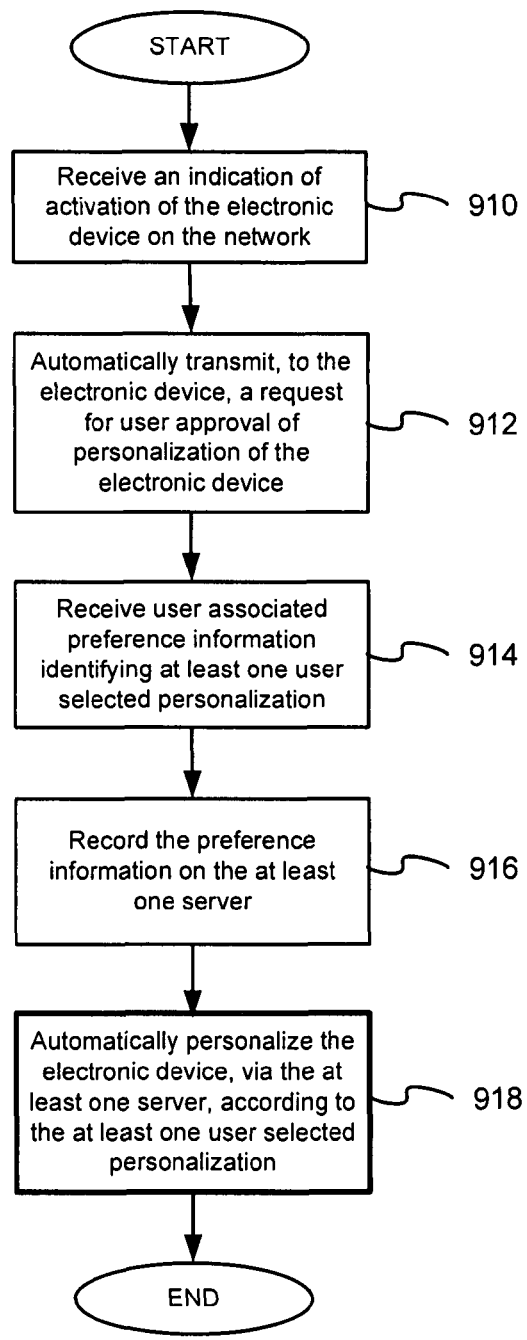
FIG. 9 is a flowchart of an exemplary method supporting delivery of personalized information via a network from at least one server to an electronic device of a user, in accordance with a representative embodiment of the present invention.

FIG. 9 is a flowchart of an exemplary method supporting delivery of personalized information via a network from at least one server to an electronic device of a user, in accordance with a representative embodiment of the present invention. The at least one server may comprises a device management server such as, for example, the DM server 109 of FIG. 1 or multiple management authority server 811 of FIG. 8. The method of FIG. 9 begins, at block 910, where the DM server receives an indication of activation of the electronic device on the network. Next, at block 912, the DM server automatically transmits, to the electronic device, a request for user approval of personalization of the electronic device. At block 914, the DM server receives user associated preference information identifying at least one user selected personalization. Then, at block 916, the method records the preference information on the at least one server. Finally, at block 918, the method automatically personalizes the electronic device, via the at least one server, according to the at least one user selected personalization.

Aspects of representative embodiments of the present invention may be seen in a system supporting delivery of personalized information via an electronic device of a user. In some representative embodiments of the present invention, the system comprises at least one server communicatively coupled to the electronic device via a network. The at least one server of such an embodiment is operable to, at least, receive preference information associated with a user, automatically activate at least one network-based service for the user according to the user associated preference information, and automatically distribute update information to the electronic device that enables user access to the at least one network-based service. The at least one server of such a representative embodiment of the present invention is also operable to, at least, retrieve information identifying content available from the at least one network-based service, aggregate the retrieved information to produce a content update, and transmit the content update to the electronic device according to the preference information associated with the user. In various representative embodiments of the present invention, the electronic device may be a mobile device, and may comprise one of a cellular phone, a personal digital assistant, and a pager, and the network may be a wireless network. The preference information may be received via the electronic device, and the update information may update one or more of program code, information for display, audio information for playback, and/or settings, of the electronic device. The retrieving may be performed periodically, according to the preference information. The at least one server may comprise a device management server compliant with the Open Mobile Alliance (OMA) version 1.2 or earlier device management protocol.

Addition aspects of representative embodiments of the present invention may be found in a method supporting delivery of personalized information via a network from at least one server to an electronic device of a user. Some representative embodiments of the present invention, the method comprises receiving an indication of activation of the electronic device on the network, automatically transmitting, to the electronic device, a request for user approval of personalization of the electronic device, and receiving user associated preference information identifying at least one user selected personalization. Some representative embodiments of the present invention also comprise recording the preference information on the at least one server, and automatically personalizing the electronic device, via the at least one server, according to the at least one user selected personalization. A representative embodiment of the present invention may also comprise automatically activating at least one network-based service, according to the preference information. Personalizing may comprise updating one or more of program code, information for display, audio information for playback, and/or settings of the electronic device, and the electronic device may comprise one of a cellular phone, a personal digital assistant, and a pager. The network may be a wireless network, and the preference information may be received via the electronic device. In some representative embodiments of the present invention the method also comprises automatically removing, from the electronic device, personalizations for a prior user of the electronic device. Personalizations may comprise updates to one or more of program code, information for display, audio information for playback, and/or settings of the electronic device.

Yet other aspects of the present invention may be seen in an electronic device supporting personalization associated with a user. An electronic device in accordance with some representative embodiments of the present invention comprises at least one processor communicatively coupled via a network to at least one server. The at least one processor is operable to, at least, receive a request for user approval of personalization of the electronic device, prompt the user for information identifying at least one user associated preference, and transmit the preference information to the at least one server. The at least one processor of some representative embodiments of the present invention is operable to, at least, receive update information provided by the at least one server using the preference information, and personalize the electronic device using the received update information, wherein the personalization enables user access to at least one network-based service. The personalization may comprise updating one or more of program code, information for display, audio information for playback, and/or settings of the electronic device, the electronic device may comprise one of a cellular phone, a personal digital assistant, and a pager, and the network may be a wireless network.

Although a system and method according to the present invention has been described in connection with the preferred embodiment, it is not intended to be limited to the specific form set forth herein, but on the contrary, it is intended to cover such alternative, modifications, and equivalents, as can be reasonably included within the scope of the invention as defined by this disclosure and appended diagrams.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system supporting delivery of personalized information via an electronic device of a user, the system comprising:
at least one server communicatively coupled to the electronic device via a network, the at least one server operable to, at least:
receive preference information associated with a user;
automatically activate at least one network-based service for the user according to the user associated preference information;
automatically distribute update information to the electronic device that enables user access to the at least one network-based service;
retrieve information identifying content available from the at least one network-based service;
aggregate the retrieved information to produce a content update; and
transmit the content update to the electronic device according to the preference information associated with the user.

2. The system according to claim 1, wherein the electronic device is a mobile device.

3. The system according to claim 2, wherein the electronic device comprises one of a cellular phone, a personal digital assistant, and a pager.

4. The system according to claim 1, wherein the preference information is received via the electronic device.

5. The system according to claim 1, wherein the update information updates one or more of program code, information for display, audio information for playback, and/or settings, of the electronic device.

6. The system according to claim 1, wherein the retrieving is performed periodically, according to the preference information.

7. The system according to claim 1, wherein the at least one server comprises a device management server compliant with the Open Mobile Alliance (OMA) version 1.2 or earlier device management protocol.

8. A method supporting delivery of personalized information via a network from at least one server to an electronic device of a user, the method comprising:
receiving an indication of activation of the electronic device on the network;
automatically transmitting, to the electronic device, a request for user approval of personalization of the electronic device;
receiving user associated preference information identifying at least one user selected personalization;
recording the preference information on the at least one server; and
automatically personalizing the electronic device, via the at least one server, according to the at least one user selected personalization.

9. The method according to claim 8, further comprising: automatically activating at least one network-based service, according to the preference information.

10. The method according to claim 8, wherein personalizing comprises updating one or more of program code, information for display, audio information for playback, and/or settings of the electronic device.

11. The method according to claim 8, wherein the electronic device comprises one of a cellular phone, a personal digital assistant, and a pager.

12. The method according to claim 8, wherein the preference information is received via the electronic device.

13. The method according to claim 8, further comprising: automatically removing, from the electronic device, personalizations for a prior user of the electronic device.

14. The method according to claim 13, wherein personalizations comprise updates to one or more of program code, information for display, audio information for playback, and/or settings of the electronic device.

15. An electronic device supporting personalization associated with a user, the electronic device comprising:
at least one processor communicatively coupled via a network to at least one server, the at least one processor operable to, at least:
receive a request for user approval of personalization of the electronic device;
prompt the user for information identifying at least one user associated preference;
transmit the preference information to the at least one server;
receive update information provided by the at least one server using the preference information; and
personalize the electronic device using the received update information, wherein the personalization enables user access to at least one network-based service.

16. The electronic device according to claim 15, wherein the personalization comprises updating one or more of program code, information for display, audio information for playback, and/or settings of the electronic device.

17. The electronic device according to claim 15, wherein the electronic device comprises one of a cellular phone, a personal digital assistant, and a pager.

18. The electronic device according to claim 15, wherein the network is a wireless network.

19. The system according to claim 1, wherein the at least one server is configured to:
aggregate the retrieved information to produce pre-packaged theme-based content;
transmit a list of available prepackaged theme-based content to the electronic device for selection;
receive a selection of one or more of the prepackaged theme-based content; and
transmit the one or more prepackaged theme-based content to the electronic device.

20. The system according to claim 1, wherein the at least one server is configured to share the received preference information associated with the user on a community services/social website.

21. The method of claim 8, wherein the request for user approval of personalization of the electronic device is automatically transmitted to the electronic device solely in response to the received indication of activation of the electronic device on the network.

* * * * *